US008492509B2

(12) United States Patent
Wang (10) Patent No.: US 8,492,509 B2
(45) Date of Patent: Jul. 23, 2013

(54) SULFUR FUNCTIONALIZED POLYMERS FOR SEPARATION OF METALS FROM GAS AND LIQUID AND METHODS FOR PREPARATION THEREOF

(75) Inventor: Pingshan Wang, Hudson, OH (US)

(73) Assignee: Chemnano Materials, Ltd., Hudson, OH (US)

( * ) Notice: Subject to any disclaimer, the term of this patent is extended or adjusted under 35 U.S.C. 154(b) by 337 days.

(21) Appl. No.: 12/800,272

(22) Filed: May 12, 2010

(65) Prior Publication Data
US 2010/0288124 A1 Nov. 18, 2010

Related U.S. Application Data

(60) Provisional application No. 61/216,023, filed on May 12, 2009.

(51) Int. Cl.
C08G 75/04 (2006.01)
C08G 79/02 (2006.01)
C08G 75/00 (2006.01)
C08G 79/00 (2006.01)

(52) U.S. Cl.
USPC ........... 528/374; 528/373; 528/399; 528/423; 210/688; 95/133; 95/134

(58) Field of Classification Search
USPC ..... 528/374, 373, 399, 423; 210/688; 95/133, 95/134
See application file for complete search history.

(56) References Cited

U.S. PATENT DOCUMENTS

| | | |
|---|---|---|
| 3,206,407 A | 9/1965 | Lutwack |
| 3,309,345 A | 3/1967 | Lutwack |
| 3,960,783 A | 6/1976 | Seltzer et al. |
| 5,075,444 A | 12/1991 | Hentschel et al. |
| 5,288,728 A | 2/1994 | Spears et al. |
| 5,372,619 A | 12/1994 | Greinke et al. |
| 5,834,020 A | 11/1998 | Margerum et al. |
| 6,953,494 B2 | 10/2005 | Nelson, Jr. |

OTHER PUBLICATIONS

Degussa, TMT 15® Environmentally Friendly Separation of Heavy Metals from Wastewater, 6 pages, date unknown but prior to application filing date.
XP-002690359, WPI, Thomson Scientific, London GB, Apr. 27, 1978, 1 page.
XP-002690355, WPI, Thomson Scientific, London GB, Jul. 30, 1979, 1 page.
XP-002690356, WPI, Thomson Scientific, London GB, Dec. 20, 1978, 1 page.

*Primary Examiner* — Duc Truong
(74) *Attorney, Agent, or Firm* — Hudak, Shunk & Farine Co. LPA (57) ABSTRACT

Methods of preparation and application of sulfur functionalized polymers. More particularly, triazine, cyclotriphosphazene and/or phenyl derivatives can be polymerized to form sulfur functionalized polymers. The materials can be used for separating heavy metals from gas and liquid. The invention is a solid extractant or sorbent that upon exposure or contact with a gas and/or liquid can remove contaminates or impurities. The material can be employed as a solid agent to remove mercury and other heavy metal from combustion, calcinations and/or industrial gases. Also, the material can be applied as extracting agent for removing mercury and other heavy metal from a liquid phase. Further, the material can be used for removing/recovering hazardous elements from radioactive nuclear waste; or can be used for removing organic compounds from gases and liquids.

14 Claims, 4 Drawing Sheets

SULFUR FUNCTIONALIZED POLYMERS FOR SEPARATION OF METALS FROM GAS AND LIQUID AND METHODS FOR PREPARATION THEREOF

FIELD OF THE INVENTION

The present invention relates to methods of preparation and application of sulfur functionalized polymers. More particularly, triazine, cyclotriphosphazene and/or phenyl derivatives can be polymerized to form sulfur functionalized polymers. The invention materials can be used for separating heavy metals, from fluids, e.g. gases and liquids, such as but not limited to mercury, copper, zinc, nickel, silver, lead, gold, arsenic, palladium, platinum, chromium, manganese, iron, cobalt and/or cadmium. The invention is a solid extractant or sorbent that upon exposure or contact with a gas and/or liquid can remove contaminates or impurities. More particularly, the invention material can be employed as a solid agent to remove mercury and other heavy metal from combustion, calcinations and/or industrial gases. Also, the invention material can be applied as extracting agent for removing mercury and other heavy metal from a liquid phase. Further, the invention material can be used for removing/recovering hazardous elements from radioactive nuclear waste. More particularly, the invention material can be used for removing organic compounds from gases and liquids.

BACKGROUND OF THE INVENTION

Nanomaterials have high surface area and high mechanical strength. Owing to their exceptional chemical/physical stability, nanomaterials have been widely used in harsh/corrosive and elevated temperature environments.

On the other hand, activated carbon, polymer, copolymer, oligomer and/or organic molecules can be used as heavy metal sorbents via electrostatic, $\pi$-$\pi$ and/or $\sigma$-$\pi$ associations, namely physical associations.

Most metal sulfides, such as mercury sulfide, are highly stable inorganic salts with an extremely low stability constant (HgS: log K=−22.3). Such mercury sulfide (HgS) typically has very low solubility in water, and isn't toxic unlike most of the other mercury compounds and can be stored and transported without any problem.

In a large number of combustion processes, mercury is transferred to the gaseous phase and must be removed by subsequent treatment. At present in industrial fields, two methods are primarily used for waste-gas purification: 1) The gas is treated with sulfuric acid (90%) at 200° C. The mercury (I) sulfate formed is deposited in wash towers. Further mercury removal is performed by after purification with sodium sulfide. 2) The cooled and dusted roast gas is treated with a mercury(II) chloride solution, and mercury precipitates as mercury(I) chloride ($Hg_2Cl_2$). Mercury is removed from the wash liquid by treatment with sodium sulfide. Part of the mercury(I) chloride produced is oxidized to mercury(II) chloride with gaseous chlorine and returned to the process. The final level of mercury in the waste gas is 0.05-0.1 $mg/m^3$.

At current coal-fired power plants, injections of powdered active carbon (PAC) or active carbon impregnated with sulfur, fluoride, chloride, bromide, iodine and other compounds for mercury removing are predominantly applied as mercury adsorbents (U.S. Pat. No. 5,372,619 and U.S. Pat. No. 6,953,494); however, the halogens are mostly physically absorbed on/in the surface or pore of active carbon, which could be de-absorbed during the storage and shipment, especially at an elevated temperature. Furthermore, the halogen elements usually are highly corrosive and volatile. When halogen-impregnated active carbons are injected into flue gas prior to electrostatic separation precipitator, the resulting mercury sorbent is mixed with great volume of fly ash, which needs to be disposed of in a landfill. Accordingly the methods of PAC Hg removal technologies are not exactly "mercury removal", the target mercury is just partitioned and transferred to the huge amount of solid waste.

Many materials and devices can be used in purification methods to remove mercury and other heavy metals from wastewater. Examples are activated carbon filters, ion exchangers, and electrolysis systems. Mercury and other heavy metals can also be removed from solution by addition of suitable reagents.

To purify scrubber waste water from refuse combined heating and power stations, the additive TMT-15 solution developed by Degussa (U.S. Pat. No. 5,075,444) is used in some cases on an industrial scale. The active substance of the additive consists of trimercapto-s-trazine solution in the form of a sodium salt. Mercury is bound as $(C_3N_3S_3Hg_x)_n$, which is stable up to 210° C. and is only sparingly soluble in the elution test. The mercury content is reduced from ca. 4 mg/L to <0.05 mg/L (Degussa Brochure 1982). In order to achieve the best performance, the pH-value of the treated waste water should be adjusted to a neutral or slightly alkaline range, because the complex $(C_3N_3S_3Hg_x)_n$ of TMT with mercury has certain solubility in acid environments.

For ion exchangers, a distinction can be made between reusable and disposable ones (Rosenzweig, *Chem. Eng.* (london), 1975, 82, 60; Bergk et al, *Chem.* 1977, 17, 85). In some cases, sulfur-containing substances are used as active agent, which remove mercury from the solution by forming a mercury sulfide compound.

Small amounts of oil dispersed in the aqueous solution can enhance the content of enriching mercury in the oil phase. The mercury content of the purified aqueous solution is in some cases <10 µg/L. Fine purification is carried out by using a conventional oil-water emulsion splitting unit.

SUMMARY OF THE INVENTION

To at least meet the requirements of the U.S. Environmental and Protection Agency (EPA) and the U.S. Department of Energy (DOE) to lower the limit of mercury and other harmful heavy metals discharge, this invention discloses new methods and materials to separate heavy metal by utilizing sulfur-containing invented polymer (hereinafter referred to as Poly-SR). The term polymer when utilized herein refers to either a homopolymer or a copolymer of two or more different monomers. The advantage of Poly-SR is to produce the applicable mercury and heavy metal control material; sulfur functionalized Poly-SR may be considered as extractant and/or sorbent to complex, chelate and/or absorb the target heavy metals, such as mercury, to form a highly stable mercury sulfide complex that results in mercury enrichment and elimination.

The invention material can be synthesized by using different ratios of halogenated compounds, such as cyanuric chloride and/or hexachlorocyclotriphosphazene to react with selected functional monomer to form the key intermediate, chloride-containing polymer. The key intermediate can be further treated with sodium hydrosulfide and/or other sulfur-containing compounds to form Poly-SR. The process and procedure of making invention material can be varied.

The selected functional monomer possesses at least two functional groups selected from a terminal amino ($NH_2$) group, a hydroxyl (OH) group, a thiol (SH) group, or combination thereof.

An object of the invention is to provide exceptionally stable, low cost and easily synthesized materials, namely, Poly-SR. Due to the nature of multi-active sites of halogenated compounds, the invention material may have a cross-linked network or zeolite structure, which may facilitate manufacture of filters, molecular sieves or membranes without/with other additive content. The invention material may not only be applied in neutral or alkaline conditions, but in a number of acidic environments.

For the purpose of illustration drawings of chemical structures and reactions are described in present invention. It is to be understood that the same may not represent the exact forms; and the illustrations do not limit the invention.

The benefit of using the current invention material as solid extractant for heavy metal removal, such as mercury, is that the resulting mercury complex (Poly-$Hg_mSR_n$) may be further treated for the purpose of recovering the mercury ($Hg^0$ and/or $Hg^{2+}$), thus allowing the production of regenerated Poly-SR without or having less mercury content. The regenerated Poly-SR may be recycled for reuse.

The invention can utilize commercially available or modified monomer, which possesses at least two terminal groups selected from one or more of amino ($NH_2$), hydroxyl (OH) and/or thiol (SH) groups for the purpose of polymerizing halogenated compounds, including but not limited to cyanuric chloride (CAS: 108-77-0), hexachlorocyclotriphosphazene (CAS: 940-71-6), hexachlorobenzene (CAS: 118-74-1), or hexafluorobenzene (CAS: 392-56-3) or combination thereof.

In one embodiment, the sulfur functionalized polymer has the general formula:

wherein each A, independently, is a connecting group comprising one or more of an aryl group, an alkyl group, an alkoxy group, a heteroaromatic ring, a polymer, a polyalkylene glycol chain, a macromolecule, a hyperbranched molecule, a cellulose, a starch, a chitosan, a nanomaterial, and a functional molecule, wherein each B, independently is nitrogen (NH), a tertiary amine, oxygen or sulfur, wherein each S, independently, is sulfur or a sulfur cluster, wherein each X, independently is hydrogen or a metal, ammonium, an aryl group, an alkyl group, an alkoxy group, a heteroaromatic ring, a polymer, a polyalkylene glycol chain, a macromolecule, a hyperbranched molecule, a cellulose, a starch, a chitosan, a nanomaterial, a functional molecule, or a combination thereof, wherein each of n, m and k are integers ranging from 0 to 500 with the proviso that at least one of n and m are at least one, and p is an integer ranging from 1 to 200.

The sulfide functionalized polymers (Poly-SR) have following general formula (I), (II) and (III):

in which each R, independently, is a connecting group, including but not limited to a macromolecule, a hyperbranched molecule, a polymer, a cellulose, a starch, a chitosan, an alkyl group, an alkoxy group, an aryl group, a heteroaromatic group, a polyalkylene glycol chain, a nanomaterial, a functional molecule, or a combination thereof. Specific examples of the connecting group monomers that include at least two terminal active groups as described below, include, but are not limited to, p-phenylenediamine [CAS: 106-50-3], 4,4''-diamino-p-terphenyl [CAS: 3365-85-3], 2,5-diaminopyridine [CAS: 4318-76-7], 2,6-diaminopyridine [CAS: 141-86-6], 4-aminophenol [CAS: 123-30-8], 4-amino-1-naphthol [5959-56-8], 4-aminothiophenol [1193-02-8], 3,5-diamino-1,2,4-triazole [1455-77-2], resorcinol [CAS: 108-46-3], hydroquinone [CAS: 123-31-9], 4,4'-dihydroxydiphenyl sulfone [CAS: 80-09-1], 1,4-benzenedithiol [CAS: 624-39-5], bis(4-mercaptophenyl) sulfide [CAS: 19362-77-7], 4,4'-diaminodiphenyl sulfone [CAS: 80-08-0], 4,4'-diamino-2,2'-biphenyldisulfonic acid [CAS: 117-61-3], 4,4'-diaminostilbebe-2,2'-biphenyldisulfonic acid [CAS: 81-11-8], 1,5-diaminnaphthalene [CAS: 2243-62-1], 4,4'-diaminodiphenylmethane [CAS: 101-77-9], polyethyleneimine [CAS: 9002-98-6], ethylenediamine [CAS: 107-15-3] or combination thereof. At least one functional monomer from which the R group is derived for each of (I), (II) and (III) must have at least two terminal active groups selected from one or more of an amino group ($NH_2$), a hydroxyl group (OH) and a thiol (SH) group. In the formulae, S can be not only the single sulfide (S), but the sulfur cluster ($S_n$). In the formula (I), (II) and (III), X is hydrogen or a metal, e.g. sodium, lithium, potassium. In (I) and (II) n ranges from 1 to about 500 and in (III) n, m and k independently range from 0 to about 500 with the proviso that at least one of n and m are present.

Accordingly, one aspect of the invention is a sulfur functionalized polymer derived from a halogenated aromatic compound, a functional monomer having at least two terminal functional groups, and a sulfur-containing material.

A further aspect of the invention is a method of extracting material from a fluid, comprising the step of contacting the fluid with a sulfur functionalized polymer, said polymer derived from a halogenated aromatic compound, a functional monomer having at least two terminal functional groups and a sulfur-containing material.

DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

Figure 1:
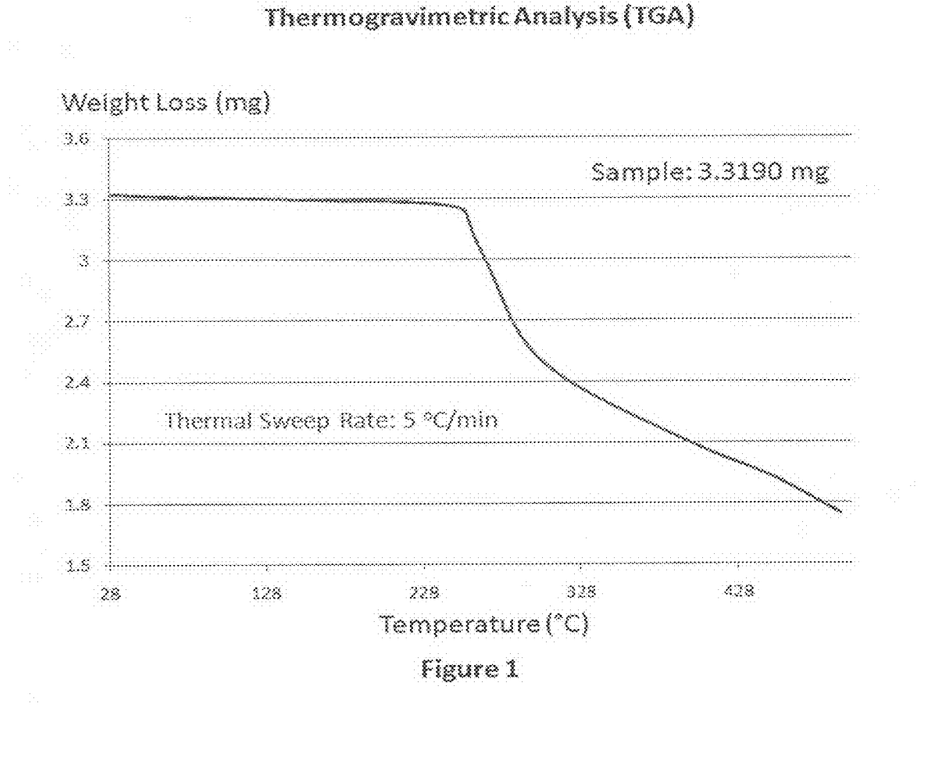
FIG. 1 is chart illustrating a thermogravimetric analysis (TGA) of sulfur functionalized polymer (Poly-SR), which was synthesized by using p-phenylenediamine [CAS: 106-50-3], cyanuric chloride, hexachlorocyclotriphosphazene and sodium hydrosulfide [see formula (III)].
Figure 2:
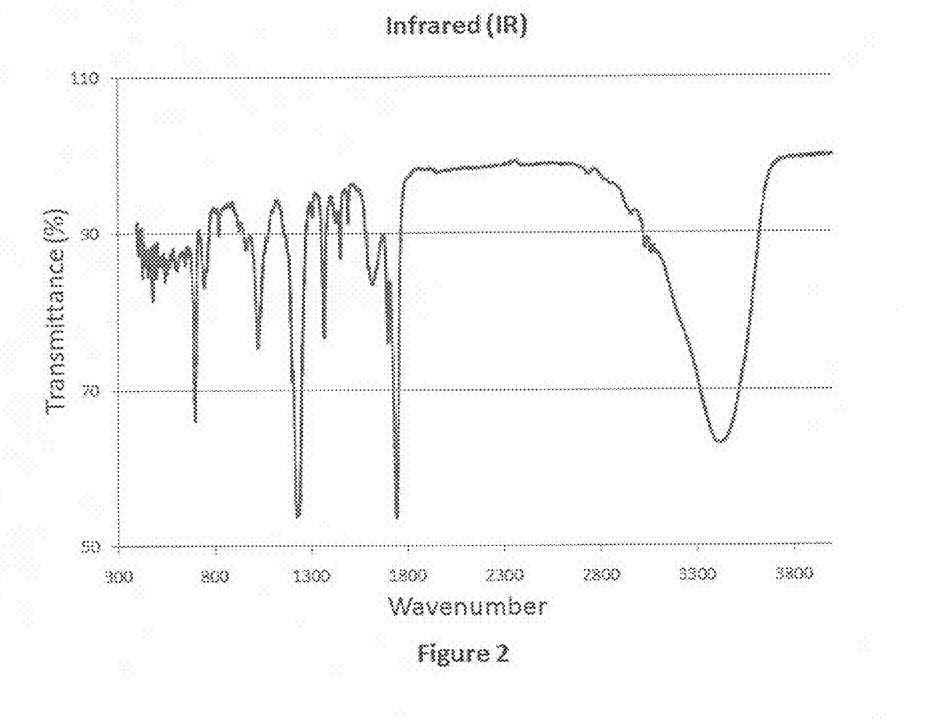
FIG. 2 is a chart illustration an infrared (IR) spectrum of sulfur functionalized polymer (Poly-SR), which was synthesized by using p-phenylenediamine [CAS: 106-50-3], cyanuric chloride, hexachlorocyclotriphosphazene and sodium hydrosulfide [see formula (III)].
Figure 3:
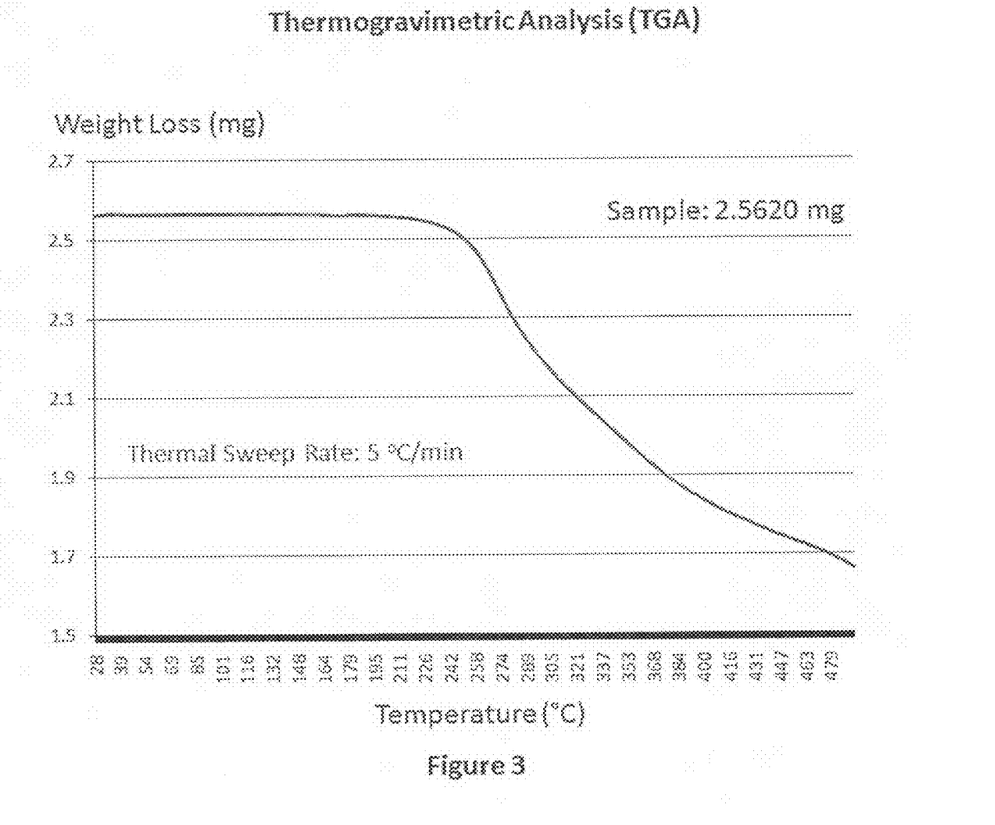
FIG. 3 is a chart illustrating a thermogravimetric analysis (TGA) of sulfur functionalized polymer (Poly-SR), which was synthesized by using 4,4'-diaminodiphenyl ether [CAS: 101-80-4], cyanuric chloride, hexachlorocyclotriphosphazene and sodium hydrosulfide [see formula (III)].
Figure 4:
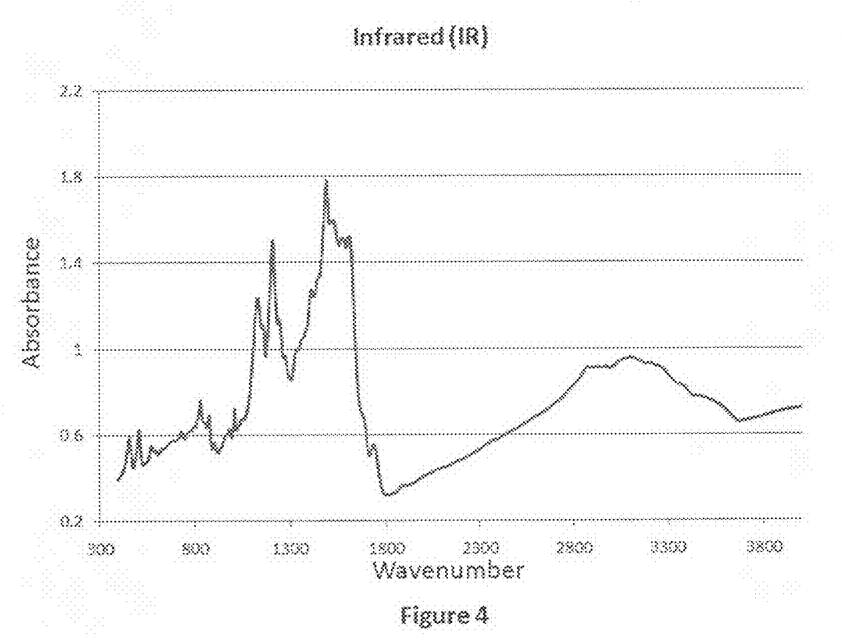
FIG. 4 is a chart illustrating an infrared (IR) spectrum of sulfur functionalized polymer (Poly-SR), which was synthesized by using 4,4'-diaminodiphenyl ether [CAS: 101-80-4], cyanuric chloride, hexachlorocyclotriphosphazene and sodium hydrosulfide [see formula (III)].

The sulfur functionalized polymers of the invention are particularly useful for removing heavy metals from fluids, such as liquids or gasses. The invented extraction method may be employed by solid-gas process, with application fields including but not limited to combustion gas, coal-fired power plant flue gas, natural gas or other industrial gas. The extraction method of the invention may be employed by solid-liquid process, wherein the waste liquids are aqueous, organic, or their combinations; with application fields including but not limited to ore refinery, radioactive nuclear waste, food industry, pharmaceutical industry, industrial liquid waste, diesel, gasoline and hazardous metal contaminated liquid.

The invention sulfur functionalized polymer (Poly-SR) is preferably a solid with excellent stability at an elevated temperature. Poly-SR may be mixed directly with gas and/or liquid phase, or fabricated as molecular sieves or filters to let gas and liquid pass therethrough.

In one embodiment of the invention [see formula (IV) and (V)], amino ($NH_2$), hydroxyl (OH) and/or thiol (SH) containing functional monomer, for example p-phenylenediamine, is first reacted with cyanuric chloride 2 and/or hexachlorocyclotriphosphazene 7, for example, to obtain the key intermediate, Poly-R (3 or 8). In a further step for forming hydrosulfide functionalized polymers (Poly-SR), the Poly-R is reacted with sodium hydrosulfide. After further reacting with alkali metal hydroxide or ammonium hydroxide, the alkali metal or ammonium salt of invention polymer (Poly-SR) is produced. Poly-SR (5, 6, 9 or 10) may possess a porous or zeolite network-like feature. The following formulae (IV) and (V) illustrate various reaction pathways for synthesizing Poly-SR.

In one embodiment of the invention, the functional reactant or monomer, including but not limited to a macromolecule, a hyperbranched molecule, a nanomaterial, a polymer, cellulose, starch, chitosan, a nanomaterial or functional molecule which has at least two terminal amino ($NH_2$), hydroxy (OH) and/or thio (SH) groups, can also react with halogenated compound to form the chloride-containing key intermediate (the intermediates may have the cross-linking network aspect). Consequently, the key intermediate can react with sodium hydrosulfide or another sulfur-containing material to produce the sulfur functionalized polymer.

The process and procedure of producing the invention polymer may be varied.

One embodiment of the invention, which can also be called "NanoDM" (Nanomaterials for De-Metalization), of solid-gas or solid-liquid separation processes for removal of heavy metals may be accomplished by mixing or combining the invention material with gas or liquid along with one or more of agitating, shaking, heating and sonication.

The invention material may be mixed with other solid material or additive, including but not limited to one or more of $SiO_2$, $TiO_2$, $SnO_2$, $Al_2O_3$, $H_4SiW_{12}O_2$, zeolite, active carbon, celite, and ceramic material. The invention material may also be mixed with other organic additive, including but not limited to one or more of mineral oil, white oil, ester oil, macromolecule, and polymer. The invention materials may be manufactured as a filter, a molecular sieve, a membrane, an ion exchanger, an additive or a column filling etc.

The invention provides the new and simple method of preparing the useful sulfur-containing polymer for the application of removing hazardous materials from liquid or gas, including but not limited to combustion gas, radioactive nuclear waste, natural gas and industrial waste. The invention material may have application in the fields of, including but not limited to, polymer/rubber industry, gas and/or liquid purification, gas and/or liquid separation, membrane, respirator mask, paint, catalyst, additive, optoelectronic material, semiconductor, light-emitting diode, filter material, electronic material, photographic material, cosmetic industry, odor control, sensor and detector, solar cell, fuel cell, pharmaceutical industry, food industry and/or chemotherapy.

The metal complex (Poly-$M_mSR_n$) derived from Poly-SR and its further modified material may have application in areas, including but not limited to catalyst, $CO_2$ sequestration, additive, gas and/or liquid purification, gas and/or liquid separation, solar cell, fuel cell, sensor, electronic material or membrane.

The invention material may be used as the agent, reagent and reactant for other purposes.

The current invention material in one embodiment has application in rubber industry. Vulcanization is a cross-linking process; and the invention material may be used as a rubber accelerator for vulcanization in order to enhance the rubber performance.

The following examples serve to illustrate methods and embodiments of the invention in detail but do not limit the apparent possibilities of variations and modifications without departing from the scope of the invention.

EXAMPLES

Raw materials, solvents and reagents were purchased from Aldrich, Alfa Aesar, TCI America, Acros America and Fisher Scientific et al.

Example 1

Synthesis of Poly-SR by Using Cyanuric Chloride and p-phenylenediamine

500 g of p-phenylenediamine and 934 g of triethylamine were solubilized in DMF (2.9 L), the solution was added drop wise to an ice bath cooled solution of 1000 g cyanuric chloride in DMF (4.5 L), and a pale yellow precipitate was formed. After the above suspension was stirred at room temperature for 3 hours, a solution of 519.9 g sodium hydrosulfide in DMF (1.3 L) was slowly added, the pale yellow precipitate was turned to yellow precipitate. Stirring for another two hours, 3.5 L of deionized water was added. The yellow solid was filtered and washed with deionized water. The product was dried at 75° C. for overnight, 1.135 kg (yield: 99.13%) of yellow solid was collected.

The above dried yellow solid was re-suspended in 3.5 L of water, 281 g NaOH in water (0.5 L) was added at room temperature with agitation. 1.308 kg of sodium form of Poly-SR (6) was collected after the yellow solid was washed with water and dried at 75° C. overnight.

Example 2

Synthesis of Poly-SR by Using Hexachlorocyclotriphosphazene and p-phenylenediamine

13

7.8 g of p-phenylenediamine and 14.5 g of triethylamine were solubilized in DMF (100 ml), the solution was dropwise added to an ice bath cooled solution of 25 g hexachlorocyclotriphosphazene in DMF (150 ml), and an off-white precipitate was formed. After above suspension was stirred at room temperature for 3 hours, a solution of 20.5 g sodium hydrosulfide in DMF (100 ml) was slowly added. Stirring for another three hours, 500 ml of deionized. water was added. The yellow solid was filtered and washed with deionized. water. The product was dried at 75° C. for overnight, and 26.1 g of yellow solid was collected.

The above dried yellow solid was re-suspended in 250 ml of water, and 11.5 g NaOH in water (100 ml) was added at room temperature with agitation. 29.7 g of sodium form of Poly-SR (15) was collected after the yellow solid was washed with water and dried at 75° C. overnight.

Example 3

Synthesis of Poly-SR by Using Hexafluorobenzene and p-phenylenediamine

5.8 g of p-phenylenediamine and 10.9 g of triethylamine were solubilized in DMF (80 ml), the solution was drop wise added to a solution of 10 g hexafluorobenzene in DMF (120 ml), and a white precipitate was formed. After the above suspension was stirred for 4 hours, a solution of 15.3 g sodium hydrosulfide in DMSO (80 ml) was slowly added. Stirring for another three hours, 300 ml of deionized. water was added. The pale yellow solid was filtered and washed with deionized. water. The product was dried at 75° C. for overnight, 16.0 g of yellow solid was collected.

The above dried yellow solid was re-suspended in 250 ml of water, and 11.5 g NaOH in water (100 ml) was added at room temperature with agitation. 17.9 g of sodium form of Poly-SR (19) was collected after the yellow solid was washed with water and dried at 75° C. overnight.

Example 4

Synthesis of Poly-SR by Using Cyanuric Chloride, Hexachlorocyclotriphosphazene and p-phenylenediamine

586 g of p-phenylenediamine and 1095 g of triethylamine were solubilized in DMF (4 L), the solution was drop wise added to an ice bath cooled solution of 100 g hexachlorocyclotriphosphazene and 1000 g cyanuric chloride in DMF (5.5 L), and a yellow precipitate was formed. After the above suspension was stirred at room temperature for 3 hours, a solution of 446 g sodium hydrosulfide in DMF (1 L) was slowly added. Stirring for another three hours, 3.5 L of deionized. water was added. The yellow solid was filtered and washed with deionized. water. The product was dried at 75° C. overnight, and 1201 g of yellow solid was collected.

The above dried yellow solid was re-suspended in 3.5 L of water, and 286 g NaOH in water (500 ml) was added at room temperature with agitation. 1311 g of sodium form of Poly-SR (10) was collected after the yellow solid was washed with water and dried at 75° C. overnight.

Example 5

Synthesis of Poly-SR by Using Cyanuric Chloride, Hexachlorocyclotriphosphazene and Sodium Disulfide (CAS: 22868-13-9)

6.7 g of sodium disulfide was solubilized in solvent (50 ml), the solution was drop wise added to an ice bath cooled solution of 1 g hexachlorocyclotriphosphazene and 10 g cyanuric chloride in solvent (80 ml), and yellow precipitate was formed. After above suspension was stirred at room temperature for 3 hours, a solution of 10.9 g sodium hydrosulfide in solvent (50 ml) was slowly added. Stirring for another three hours, 300 ml of deionized. water was added. The yellow solid was filtered and washed with deionized. water. The product was dried at 75° C. overnight, 5.2 g of yellow solid (21) was collected.

Example 6

Synthesis of Poly-SR by Using Cyanuric Chloride, Hexachlorocyclotriphosphazene and bis(4-aminophenyl)ether (CAS: 101-80-4)

stirred at room temperature for 3 hours, a solution of 98.2 g sodium hydrosulfide in DMF (550 ml) was slowly added. Stirring for another three hours, 1500 ml of deionized water was added. The yellow solid was filtered and washed with deionized water. The product was dried at 75° C. overnight, 145 g of yellow solid (9) was collected.

Example 7

Synthesis of Poly-SR by Using Cyanuric Chloride, Hexachlorocyclotriphosphazene, p-phenylenediamine, 2-mercaptobenzothiazole (CAS: 149-30-4) and Sodium Hydrosulfide 58.6 g of p-phenyldiamine and base was solubilized in DMF (400 ml), solution was drop wise added to an ice bath cooled solution of 5 g hexachlorocyclotriphosphazene and 100 g 60.1 g of bis(4-aminophenyl)ether and base was solubilized in DMF (450 ml), the solution was drop wise added to an ice bath cooled solution of 10 g hexachlorocyclotriphosphazene and 100 g cyanuric chloride in THF (400 ml), and a pale yellow precipitate was formed. After above suspension was cyanuric chloride in NMP (N-methyl-2-pyrrolidone, 500 ml), and a yellow precipitate was formed. After the above suspension was stirred at room temperature for 3 hours, a solution of 90.7 g 2-mercaptobenzothiazole, sodium hydrosulfide and base in NMP (550 ml) was slowly added. Stirring for another four hours, 1000 ml of deionized water was added. The yellow solid was filtered and washed with deionized water. The product was dried at 75° C. overnight.

Example 8

Experiments Illustrating Removal of Metals from Liquids

Table 1 below includes results based on experiments conducted to illustrate the effectiveness of the sulfide functionalized polymers of the invention (Poly-SR). Poly-SR of the formula indicated in the table (1.0 g) was added to a metal ion containing liquid (water or DMF, ca. 120 ml and metal $Hg^{2+}$, $Pb^{2+}$, $Cd^{2+}$, $Pd^{2+}$ and/or $Ni^{2+}$) at room temperature, or at 75° C. with agitation. After a fixed time, about 3 hours, the mixture was cooled down to room temperature if needed, the solid was filtered out and the filtrate was found to contain the indicated metals upon analysis.

TABLE 1

Metal removal efficiency

| Metal | Initial Concentration (ppm) | Concentration After Treatment with Poly-SR (ppm) | Removal efficiency (%) |
| --- | --- | --- | --- |
| $Hg^{2+}$ | 450 (water or DMF) | 0 (Poly-SR 6 or 9") | 100 |
| $Pb^{2+}$ | 432 (water) | 0 (Poly-SR 6) | 100 |
| $Hg^{2+}$ + $Pb^{2+}$ | 570 (water) | 0 (Poly-SR 10') | 100 |
| $Cd^{2+}$ | 560 (water) | 0.1 (Poly-SR 10') | 99.9 |
| $Pd^{2+}$ | 320 (DMF) (75° C.) | 0.1 (Poly-SR 10') | 99.9 |
| $Ni^{2+}$ | 550 (water) (75° C.) | 1.0 (Poly-SR 9') | 99.8 |

Example 9

Experiments for Measuring Heavy Metal Absorption Capacity of Poly-SR

Poly-SR (ca. 1.5 g) of the type indicated in Table 2 was added to excess amount of metal ion aqueous solution ($Hg^{2+}$, $Cd^{2+}$ or $Pb^{2+}$ as indicated below) at room temperature. The mixture was stirred at 75° C. for 5 hours, then at room temperature overnight. The solid was filtered out, which contained selected metals, and the filtrate was analyzed. The results show that the sulfur functionalized polymer has a large metal absorption capacity.

TABLE 2

Heavy Metal Absorption Capacity:

| Heavy metal | Metal absorption Capacity (per gram of Poly-SR) |
| --- | --- |
| $Hg^{2+}$ | 195 mg (Poly-SR 6) |
| $Pb^{2+}$ | 173 mg (Poly-SR 6) |
| $CD^{2+}$ | 140 mg (Poly-SR 10') |

While in accordance with the patent statutes the best mode and preferred embodiment have been set forth, the scope of the invention is not limited thereto, but rather by the scope of the attached claims.

What is claimed is:

1. A terminal-sulfur functionalized polymer, comprising: said polymer derived from a halogenated aromatic compound, a functional monomer having at least two terminal functional groups and a sulfur-containing material, wherein said polymer includes at least one sulfur-functionalized terminal group, wherein said polymer has the following formula (1):

wherein each A, independently, is a connecting group comprising one or more of an aryl group, an alkyl group, an alkoxy group, a heteroaromatic ring, a polymer, wherein each B, independently is nitrogen (NH), a tertiary amine, oxygen or sulfur, wherein each S, independently, is sulfur or a sulfur cluster, wherein each X, independently is hydrogen, a metal, ammonium, or a combination thereof, wherein each of n, m and k are integers ranging from 0 to 500 with the proviso that at least one of n and m are at least one, and p is an integer ranging from 1 to 200.

2. A terminal-sulfur functionalized polymer, comprising: said polymer derived from a halogenated aromatic compound, a functional monomer having at least two terminal functional groups and a sulfur-containing material, wherein said polymer includes at least one sulfur-functionalized terminal group, wherein said halogenated aromatic compound is a cyanuric chloride, a hexachlorocyclotriphosphazene, a hexachlorobenzene, a hexafluorobenzene, or combination thereof.

3. The polymer according to claim 1, wherein said functional monomer has at least two terminal groups of one or more of an amino ($NH_2$) group, a secondary amine (NH), a hydroxyl (OH) group and thiol (SH) group.

4. The polymer according to claim 1, wherein said sulfur containing material has at least one terminal thiol (SH) or $S^{2-}$ group.

5. The polymer according to claim 1, wherein said terminal-sulfur functionalized polymer is capable of extracting a heavy metal, an actinide, a lanthanide, or combinations thereof.

6. The polymer according to claim 1, wherein said terminal-sulfur functionalized polymer is capable of absorbing an organic molecule or a gaseous molecule.

7. The polymer according to claim 1, wherein said terminals sulfur functionalized polymer is capable of complexing a metal.

8. The polymer according to claim 1, wherein said terminal-sulfur functionalized polymer has at least one end functionalized group, —S—X.

9. The polymer according to claim 1, wherein the terminal-sulfur containing material is an alkali metal hydrosulfide.

10. A method of extracting material from a fluid, comprising the step of: contacting the fluid with a terminal-sulfur functionalized polymer, said polymer derived from a halogenated aromatic compound, a functional monomer having at least two terminal functional groups and a sulfur-containing material, wherein said polymer includes at least one sulfur-functionalized terminal group, wherein said polymer has the following formula (1):

wherein each A, independently, is a connecting group comprising one or more of an aryl group, an alkyl group, an alkoxy group, a heteroaromatic ring, a polymer, wherein each B, independently is nitrogen (NH), a tertiary amine, oxygen or sulfur, wherein each S, independently, is sulfur or a sulfur cluster, wherein each X, independently is hydrogen, a metal, ammonium, or a combination thereof, wherein each of n, m and k are integers ranging from 0 to 500 with the proviso that at least one of n and m are at least one, and p is an integer ranging from 1 to 200.

11. The method according to claim 10, wherein the polymer absorbs or complexes the extractable material from the fluid.

12. The method according to claim 11, wherein the fluid is a liquid or gas.

13. The method according to claim 12, wherein the extractable material is mercury, copper, zinc, silver, gold, platinum, chromium, lead, cadmium, manganese, iron, cobalt, nickel, palladium or a combination thereof.

14. The method according to claim 13, wherein the extractable material is a metal complex.

* * * * *